(12) United States Patent
Uscinowicz

(10) Patent No.: US 8,730,097 B1
(45) Date of Patent: May 20, 2014

(54) DISTRIBUTED PHASED ARRAY TESTING DEVICE

(75) Inventor: Michael Uscinowicz, Hainesport, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 238 days.

(21) Appl. No.: 13/207,093

(22) Filed: Aug. 10, 2011

(51) Int. Cl.
*G01S 7/40* (2006.01)

(52) U.S. Cl.
USPC ............................. 342/173; 342/165; 342/174

(58) Field of Classification Search
USPC .................. 342/165, 173–174, 360, 368, 371
See application file for complete search history.

(56) References Cited

U.S. PATENT DOCUMENTS

| | | | |
|---|---|---|---|
| 5,519,887 A * | 5/1996 | Lieu ............................. | 455/266 |
| 5,534,873 A | 7/1996 | Weichman et al. | |
| 5,559,519 A * | 9/1996 | Fenner ......................... | 342/174 |
| 5,809,087 A * | 9/1998 | Ashe et al. .................... | 375/340 |
| 6,084,545 A | 7/2000 | Lier et al. | |
| 6,157,343 A | 12/2000 | Andersson et al. | |
| 6,255,985 B1 * | 7/2001 | Towner et al. ................ | 342/165 |
| 6,384,781 B1 * | 5/2002 | Kautz et al. .................. | 342/368 |
| 6,636,173 B2 * | 10/2003 | Graham ........................ | 342/174 |
| 6,771,216 B2 | 8/2004 | Patel et al. | |
| 6,963,301 B2 | 11/2005 | Schantz et al. | |
| 7,106,249 B2 * | 9/2006 | Kubo et al. ................... | 342/174 |
| 7,831,007 B1 * | 11/2010 | Mokhtari ...................... | 375/376 |
| 8,212,716 B2 * | 7/2012 | Goshen et al. ................ | 342/169 |

OTHER PUBLICATIONS

"Near-field vs Far-field", Nearfield Systems, Inc., © 2006, Reprinted.
Al-Rashid, Yasser, "Active Phased Array Radar Systems", Nov. 17, 2009, pp. 1-30, available at: http://www.ofcm.gov/mpar-symposium/2009/presentations/workshop/W2_Al-Rashid%20Architecture.pdf.

* cited by examiner

*Primary Examiner* — John B Sotomayor
*Assistant Examiner* — Marcus Windrich
(74) *Attorney, Agent, or Firm* — Howard IP Law Group, PC

(57) ABSTRACT

A system for testing a phased array comprising a phase-locked loop circuit responsive to a received output signal of the phased array. The phase-locked loop circuit comprises a phase detector; a filtering element, a variable frequency oscillator and a feedback loop. The system is configured to output at least one of a value indicative of the output of the phase detector and a value indicative of the output of the filtering element for estimating at least one of an imparted phase shift and an imparted frequency modulation by array.

16 Claims, 6 Drawing Sheets

DISTRIBUTED PHASED ARRAY TESTING DEVICE

FIELD OF THE INVENTION

The present invention relates generally to RADAR systems, and more specifically, to nearfield testing of phased array RADAR systems.

BACKGROUND

Modern RADAR system architectures include analog and digital phased array systems. A phased array antenna is comprised of numerous radiating elements each having a phase shifter. Beams are formed by selectively activating all or a portion of antenna elements of a given array. The beam pattern of these antennas can be controlled to produce one or more directed beams. Scanning or steering of the beams is accomplished by shifting the phase of the signals emitted from the elements in order to provide constructive and/or destructive interference. The ability to form and steer a beam permits multiple functions to be performed by the same system. As with any type of RADAR, the ability to efficiently test the functionality and accuracy of the system may be critical to achieving and maintaining system performance.

Phased RADAR arrays using analog beamforming have traditionally been tested using a planar nearfield scanner. More specifically, radio frequency (RF) equipment is configured to either receive an RF signal from an analog Array Under Test (AUT), such as AUT 10 in FIG. 1A, or transmit an RF signal to an AUT. In order to obtain the phase and amplitude changes for determining AUT performance, the equipment is configured to establish reference points at a nearfield probe and at the AUT. During nearfield scanning measurements, data is acquired via an RF receiver, and amplitude and phase measurements are characterized by the difference between the reference and test points. After the entire active aperture has been scanned and corresponding data collected, the data is processed via a Fourier Transform to obtain a pattern of the farfield energy in visible space.

As phased array technology has improved, universal digital beam forming (DBF) architecture has been implemented. Digital receivers and exciters have greatly improved phased array performance parameters, such as signal to noise, beamforming error elimination, and clutter attenuation. Many new digital phased array architectures are designed utilizing distributed digital receivers and exciters (DREX). DREX systems include, for example, an "on-array" module having a single exciter, a single receiver and a transmit/receive module (T/R module) associated with each radiating element. DREX systems offer improved RADAR performance in detection sensitivity, time sidelobes, third-order interception point and instantaneous dynamic change. However, the implementation of these on-array exciters and receivers poses new technical challenges.

For example, new testing and measurement obstacles have been encountered, as the array can no longer be represented as a transfer function of a linear system. More specifically, analog phased arrays can be represented as a complex transfer function dependent on the carrier frequency. The transfer function $H(j\omega)$ is simply the ratio of $RF_{in}$ to $RF_{out}$:

$$H(j\omega)=RF_{out}/RF_{in}$$

This linear function is relatively easily tested using a standard network analyzer. The analyzer measures the swept frequency magnitude and phase difference induced by the transfer function relative to the analyzer's self-created reference signal of known magnitude and phase.

As set forth above, DREX systems used in digital phased arrays can no longer be represented by an input RF signal, a transfer function and an RF output signal. Modern digital distributed RADAR arrays, as illustrated by digital AUT 15 in FIG. 1B, convert a digital bit stream to an RF signal when operating in a transmit ($T_x$) mode, and convert a received RF signal to a stream of digital bits when operating in a receive ($R_x$) mode. As a result of this AD/DA processing, RF-based test equipment (i.e. network analyzers) are not adequate to accurately test, debug or characterize these systems.

More specifically, when a digital array transmits to the nearfield scanner probe, a digital word is translated by the exciter's D/A converter and transmitted as an RF signal to the nearfield scanner probe. Conversely, the array receives an RF signal from the nearfield scanner probe, and an A/D converter on the digital receiver converts the analog data to digital data comprising in-phase and quadrature-phase (I/Q) data components. This I/Q data stream is then distributed to various processing locations within the phased array system.

As the nearfield scanner probe uses an analog receiver and exciter, existing systems must correlate digital I/Q data from the digital array with the analog RF data of the nearfield scanner probe. For example, the DREX modules in the array require the distribution of multiple local oscillators for up-conversion in $T_x$ mode and down-conversion in $R_x$ mode. Variations in magnitude and phase of each local oscillator are wrongly perceived as changes in amplitude or phase of the RADAR target return signal. Therefore, care must be taken in the distribution of the RADAR RF circuitry (for $T_x$ and $R_x$) in the array, as well as the distribution of the local oscillator signals in the array. This same care must be applied to the external equipment testing or characterizing the array, or the constituent components of the array. Further, the reference RF signal used for comparison to detect amplitude and phase changes is problematic. If the reference RF signal exhibits parameter changes, the array will wrongly apply internal corrections as though the array hardware was exhibiting errors.

Current solutions for testing DREX-based systems include the application of identical DREX hardware used as the testing equipment. Outfitting this RADAR-testing-RADAR solution means adding significant amounts of additional hardware, software, firmware, data recording/storage ability, and RF and local oscillator stability equipment to the system. These systems are not portable for testing or alignment of the array in the field. In addition to the added weight and expense, the system is further taxed with the need for additional cooling for the hardware. Engineering of this arrangement is also intensive and expensive.

Improved systems and methods for nearfield testing of phased arrays are desired.

SUMMARY

In one embodiment, a system for testing a phased array is provided. The system may include, for example, a phase-locked loop circuit responsive to a received modulated output signal of the phased array. The phase-locked loop circuit comprises a phase detector, a filtering element, a variable frequency oscillator and negative feedback control loop. The system is configured to output at least one of a value indicative of the output of the phase detector and a value indicative of the output of the filtering element for estimating an imparted phase shift and an imparted frequency modulation by the array, respectively. In one embodiment, the system may be implemented into a hand-held device, providing portability and ease of use in the field.

In another embodiment, a method of testing a phased array is provided. The method includes receiving a modulated output signal from the array. The signal is demodulated utilizing a phase-locked loop. The phase-locked loop comprises a phase detector, a filter and a variable frequency oscillator. The output of the variable frequency oscillator is provided in a feedback loop to an input of the phase detector. A comparison between the output of the phase detector and a predetermined phase detector response is made to estimate the modulated phase shift on the output signal of the phased array. In another embodiment, the output of the filter may be compared against a predetermined input frequency response to estimate the frequency modulation imparted on output signal of the phased array.

DETAILED DESCRIPTION

Figure 1A:
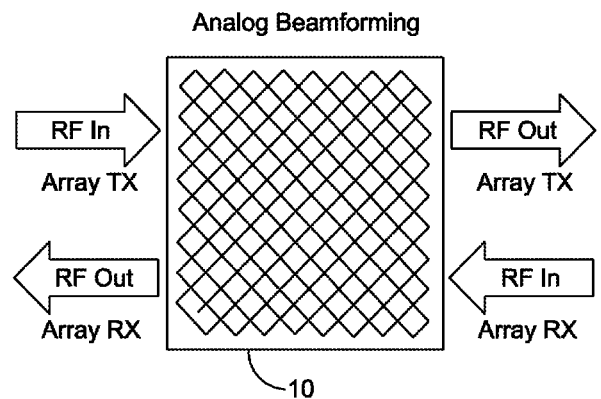
FIG. 1A is a schematic block diagram illustrating the analog-in, analog-out nature of nearfield RF signal generation in an analog phased array.
Figure 1B:
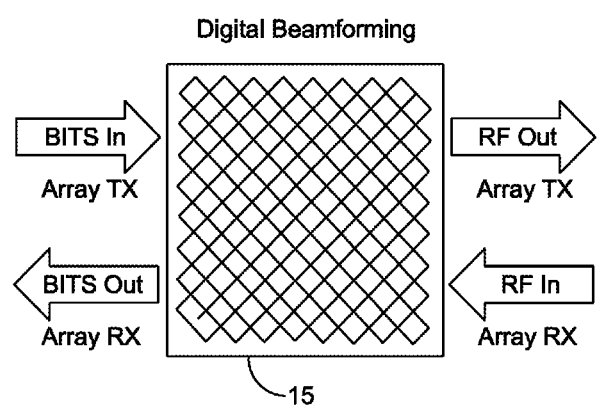
FIG. 1B is a schematic block diagram illustrating the digital-in, analog-out nature of nearfield RF signal generation in a digital phased array.

It is to be understood that the figures and descriptions of the present invention have been simplified to illustrate elements that are relevant for a clear understanding of the present invention, while eliminating, for purposes of clarity, many other elements found in typical RADAR systems, such as systems utilizing distributed receivers and exciters. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Figure 2:
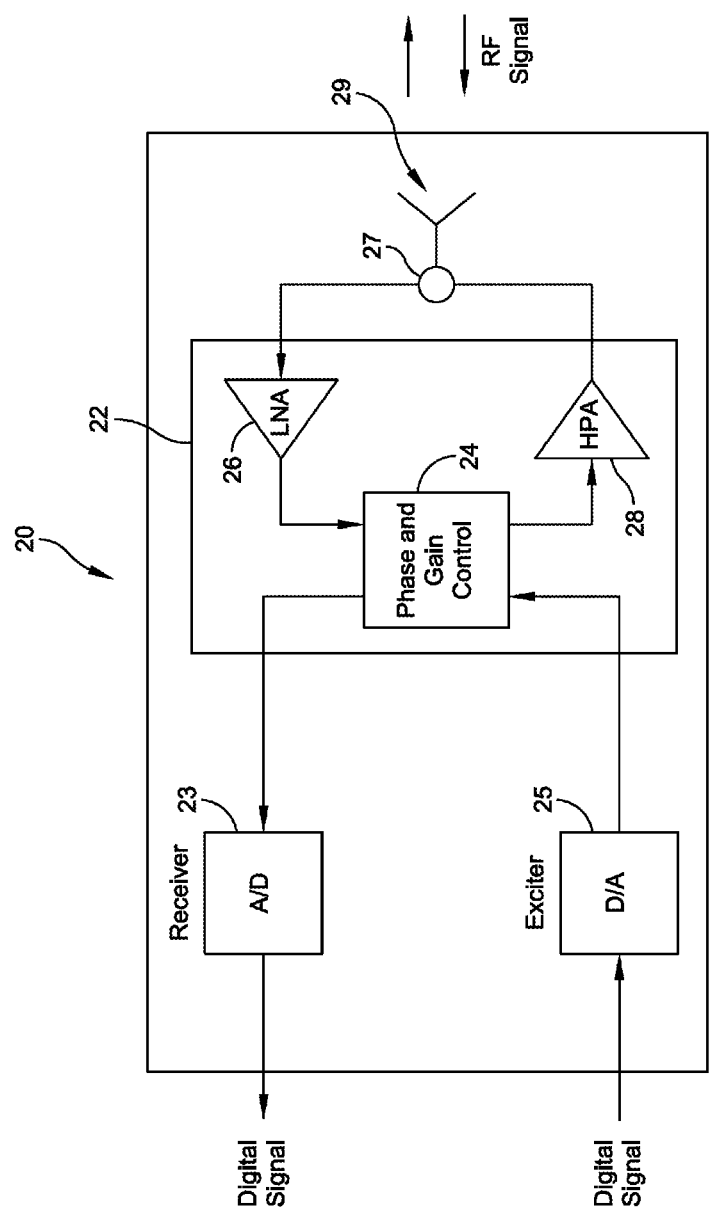
FIG. 2 is a block diagram of a DREX module used in digital phased arrays.

As set forth above, distributed phased arrays utilize multiple receivers and exciters integrated into the array architecture as a plurality of DREX sub-assemblies. Each DREX module may consist of a single exciter, a single receiver and one or more transmit/receive (T/R) modules having a radiating element (i.e. a dipole antenna) associated therewith. A simplified diagram of this arrangement is shown with respect to FIG. 2. DREX module 20 comprises a single receiver 23, a single exciter 25, and a T/R module 22 associated with a radiating element 29. T/R module 22 may comprise, for example, a phase and gain control unit 24 and amplifiers 26, 28. In a $T_x$ mode, high power amplifier 28 is provided for amplifying a modulated signal from exciter 25. In an $R_x$ mode, low-noise amplifier 26 may be utilized to boost the received signal while adding as little noise and distortion as possible. A duplexer, such as circulator 27, is provided for routing outgoing and incoming signals between radiating element 29 and receiver 23 and exciter 25. A plurality of these DREX modules are used to populate a typical phased array antenna.

DREX modules are tested as individual units prior to integration into an array assembly, as well as tested in the field as a part of routine maintenance or while diagnosing RADAR malfunction or failure. A difficulty exists in testing the DREX modules as a result of the digital vs. analog nature of its inputs and outputs. As outlined above, the input and output of radiating element 29 is an analog RF signal, however, the input to exciter 25 is a digital signal, as is the output of receiver 23. Without a common input/output protocol, RF or digital, performance changes in the DREX modules cannot easily be measured. Testing difficulties include determining if proper digitally-commanded phase shift and frequency modulation assignments have been executed by the DREX module. Accurate testing can confirm, for example, proper execution of software code and all attendant hardware components in the exciter, including the direct digital synthesizer (DDS), up conversion mixing scheme, gain stages, and phase shifters. Embodiments of the present invention include a system and method for testing the functionality of the DREX modules, including the phase shifts and frequency modulation assignments.

Figure 3:
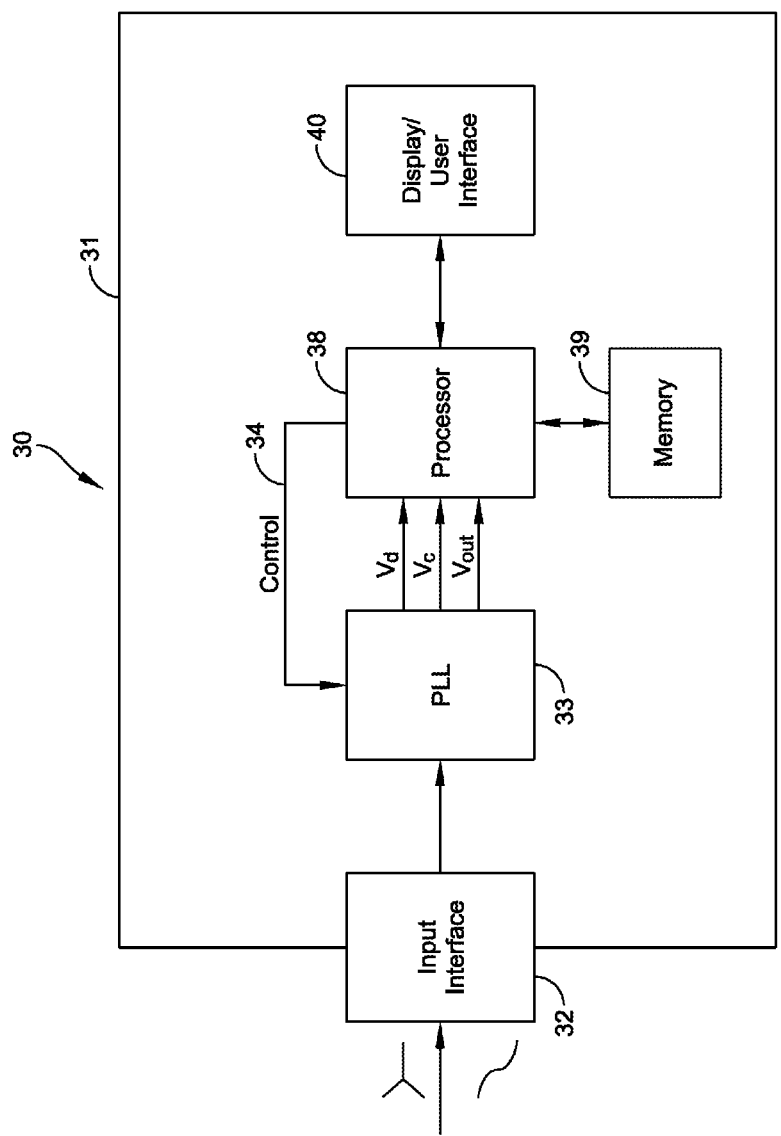
FIG. 3 is a block diagram of a device implementing a system for testing a phased array according to an embodiment of the present invention.
Figure 4:
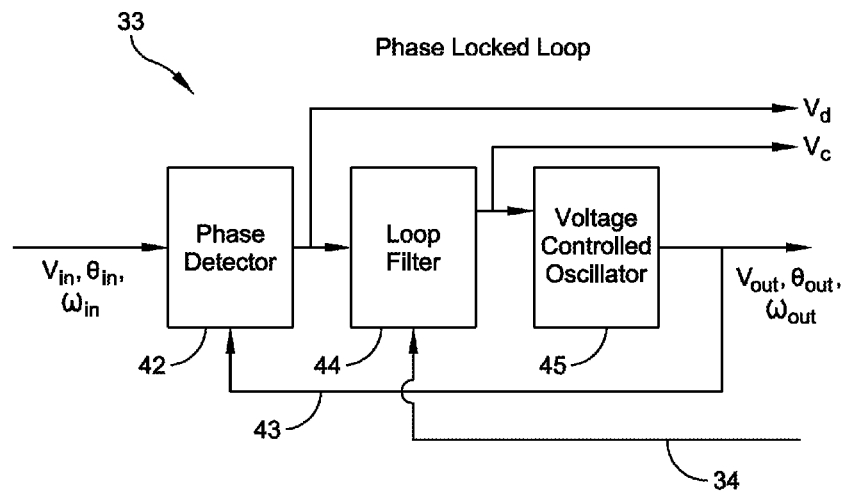
FIG. 4 is a block diagram of a phase-locked loop circuit used in a phased array testing system according to embodiments of the present invention.
Figure 5:
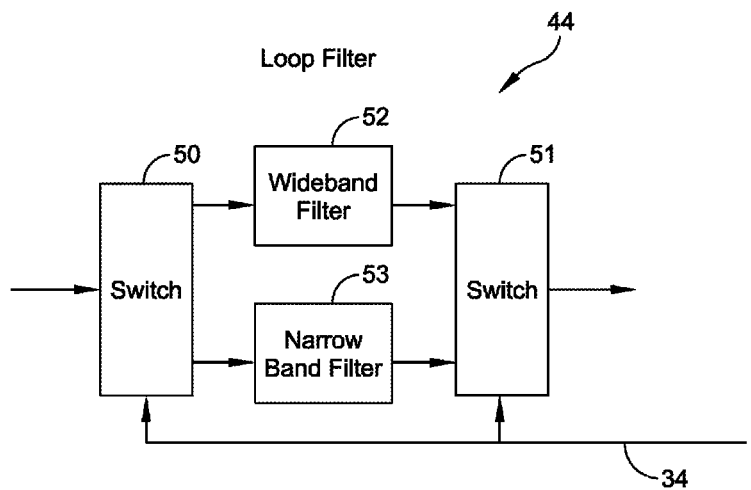
FIG. 5 is a block diagram of a switchable loop filter used in a phased array testing system according to embodiments of the present invention.

Referring generally to FIGS. 3-5, an embodiment of a system for determining the relative performance of each of the DREX modules, or a grouping thereof, is shown. In the illustrated embodiment, the system is integrated into a device 30, such as a receiver, which may be portable (e.g. hand-held) and contained within a housing 31. Device 30 is operative to receive the phase and/or frequency modulated output from one or more DREX modules, such as DREX module 20 of FIG. 2. In one embodiment, device 30 may include an input interface 32 comprising an RF antenna element for receiving a transmitted output of an array radiating element. In other embodiments, device 30 may be configured to directly connect to a front-end unit of a phased array antenna, for example, to individual DREX modules, via a wired connection for receiving a modulated exciter up-converted RF signal. Device 30 may also comprise additional components common to RF antenna and receiver arrangements, such as amplifiers and filters, as well as additional hardware, such as a power supply (e.g. a battery), control systems, and interface devices which have not been shown for the purposes of brevity.

Receiver 30 may implement at least one phase-locked loop (PLL) circuit 33, the outputs of which are used to test DREX module functionality. For example, a PLL circuit with a controllable loop bandwidth can be used to verify that the proper phase shift and frequency modulation (wideband or narrowband linear frequency modulation [LFM] for example) commanded by a RADAR control computer has been executed by the DREX module.

FIG. 4 shows an exemplary PLL circuit 33 useful for performing signal demodulation for a testing method according to embodiments of the present invention. PLL 33 comprises, for example, a demodulator, such as a phase detector or comparator 42, a loop filter 44 and a variable frequency oscillator, such as a voltage-controlled oscillator (VCO) 45. PLL 33 is responsive to an input ("reference") signal having a given phase, and is operative to, for example, generate an output signal having a phase related (e.g. equal) to the phase of the reference signal. PLL 33 is controlled through a feedback loop 43. More specifically, phase detector 42 includes two inputs, including the reference signal and a negative feedback input from VCO 45 via feedback loop 43. Phase detector 42 compares the phase $\theta_{in}$ of the reference signal with the phase $\theta_{out}$ of the output of VCO 45, and generates a control signal $V_d$ for adjusting the frequency of VCO 45 to keep the phases matched. PLL 33 may implement one or more filters 44 of varying types for altering loop dynamics and/or stability, which in turn facilitates the performance of multiple device functions, including verification of a properly executed phase shift and frequency modulation of one or more DREX modules.

In an exemplary embodiment of the present invention, and referring generally to FIG. 5, loop filter 44 of PLL 33 comprises a switchable loop filter having, for example, both wideband and narrowband filters 52,53 arranged in parallel and under selectable control via switches 50,51. Selection of narrowband filter 53 via a control signal 34 configures device 30 for testing an imparted phase shift, while selection of wideband filter 52 may be advantageous for performing frequency modulation testing.

Still referring to FIGS. 3-5, operation of the exemplary device 30 will now be set forth. A modulated input signal from an AUT having a magnitude $V_{in}$, phase $\theta_{in}$, and frequency $\omega_{in}$ is received by device 30, and input to PLL 33, and more specifically, input to phase detector 42 (FIG. 4). To test an imparted phase shift (or a relative imparted phase shift), the input signal is demodulated by selecting narrowband filter 53 of switchable loop filter 44 by a control signal 34 derived from, for example, an operator input via an interface 40 (e.g. button, switch, touch-screen or the like) located on device 30. The use of the narrowband filter provides for relatively slow response of PLL circuit 33, ensuring the output phase $\theta_{out}$ remains generally constant with respect to an average input phase $\theta_{in}$.

Figure 6:
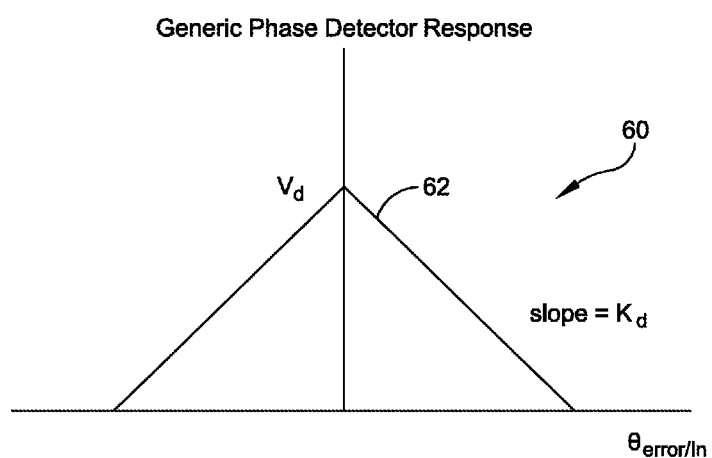
FIG. 6 is a graphical representation of an exemplary response of a phase detector used in an array testing system according to embodiments of the present invention.

As described above, phase detector 42 compares two input signals having corresponding phases $\theta_{in}$ and $\theta_{out}$, and produces an output signal of magnitude $V_d$ proportional to the phase difference measured therebetween, or phase error $\theta_{error}$ (equal to $\theta_{in}-\theta_{out}$). As $\theta_{out}$ is nearly constant, the output of the phase detector $V_d$ is directly proportional to the phase of the input signal $\theta_{in}$. An exemplary phase detector response 60 is illustrated in FIG. 6. Phase detector output $V_d$, 62 is at a maximum when the phase error is at a minimum. The phase detector's linear response can be characterized (e.g. measured) a priori to establish the relationship between the phase shift performed by the DREX module and a corresponding phase detector output voltage $V_d$. Thus the accuracy of a commanded phase shift can be observed via a comparison to $V_d$, and/or the relative imparted phase shifts across multiple DREX modules, or groupings thereof, may be determined.

In one embodiment of the present invention, during phase demodulation device 30 (FIG. 3) may be operative to output (e.g. display) to a user a parameter indicative of the phase detector output. From this output, a user may determine an imparted phase shift by referencing the predetermined phase detector response. In another embodiment, the predetermined phase detector response may be stored within device 30. For example, a measured phase detector response can be stored on a memory device 39 located within device 30 and accessible via, for example, a data bus by a processor 38. Processor 38 may also be responsive to the output of the phase detector $V_d$. In this way, processor 38 may be programmed to determine a corresponding input phase value $\theta_{in}$ from a received phase detector output $V_d$ via the stored phase detector response curve (e.g. response 60, FIG. 6). The results of this comparison may be displayed to a user by way of, for example, a display 40 located on device 30.

In addition to testing proper phase modulation, device 30 may utilize the same PLL circuit 33 to verify proper execution of the commanded frequency modulation, or to test a relative imparted frequency modulation of a plurality of DREX modules. As frequency is a derivative of phase, keeping input and output phases in lock-step implies keeping the input and output frequencies in lock step. Thus, PLL 33 can be used to track an input frequency. More specifically, in one embodiment, an imparted frequency modulation can be detected by switching loop filter 44 of PLL 33 to utilize wide-bandwidth filter 52 to improve frequency tracking. In this way, output frequency $\omega_{out}$ of PLL 33 will closely track input frequency $\omega_{in}$ given the circuit's wide-bandwidth response. Given a known transfer response of VCO 45, the output of filter 44 ($V_c$) is proportional to $\omega_{out}$, and thus $\omega_{in}$. Similar to characterizing the response of the phase detector, PLL 33 can be characterized a priori to establish $V_c$ vs. input frequency response. Therefore, a commanded frequency modulation by one or more DREX modules can be observed via a comparison to $V_c$. As set forth above, device 30 may output a value indicative of $V_c$ to a user for comparison with the pre-established relationship to input frequency. Likewise, the PLL response may be stored within device 30, and a processing and display system may be provided for conveying data more directly representative of the imparted frequency modulation to the user.

Figure 7:
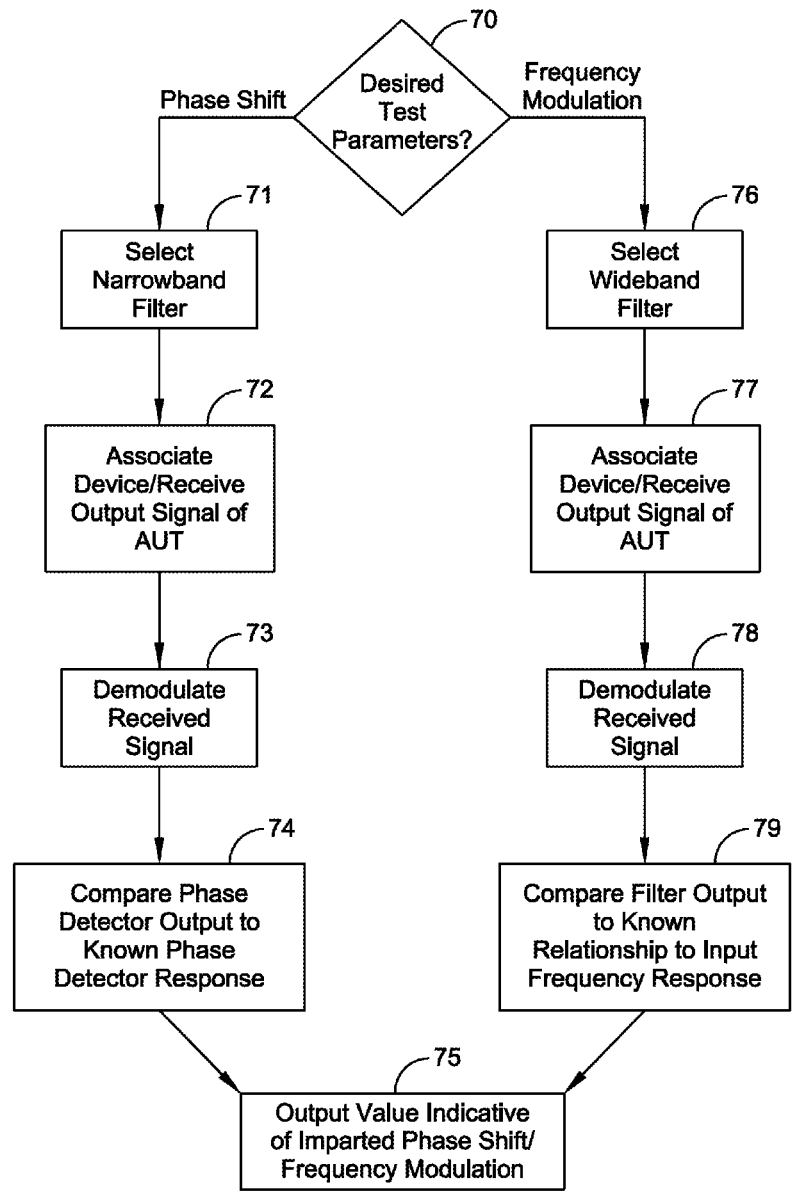
FIG. 7 is a process-flow diagram illustrating an exemplary phased array testing procedure according to embodiments of the present invention.

Referring generally to FIG. 7, a process flow diagram for performing an exemplary testing operation according to embodiments of the present invention is described. In step 70, a user may determine a desired parameter to be tested (i.e. imparted phase or frequency modulation). If phase shift detection is desired, the user may select a narrowband filter in step 71. This may be achieved by, for example, providing a switchable filter arrangement comprising both narrowband and wideband filters on a test device according to embodiments of the present invention. As set forth above, the narrowband filter ensures the phase of the output of a PLL used in the test device stays equal or nearly equal to the phase of a received input signal. In step 72, the user may associate the test device with a given array element, or group of elements. Reception of the output of the associated element(s) may be achieved wirelessly through an RF antenna operatively connected to the device, or through a wired connection between the array, or front-end module thereof, and the device.

The received output of the AUT is demodulated in step 73 by, for example the PLL circuit including a phase detector/comparator, the narrowband filter and a variable frequency oscillator. In step 74, the phase shift imparted by the array can be observed by comparing the output of the phase detector to a pre-established relationship between phase detector output and the input phase. This comparison may be made manually by a user, or the pre-established phase detector response may be stored on (or otherwise accessed by) the test device, and a value indicative of the measured phase may be output to the user in step 75.

Alternatively, if testing frequency modulation is desired, selection of the wideband filter in step 76 configures the device to perform frequency demodulation. More specifically, the wideband response of the filter promotes accurate tracking of the input frequency to the PLL (the output of the array) by the output signal of the PLL. In step 77, the test device is again associated with the AUT, and the signal demodulated in step 78 by the PLL circuit. Referring generally to step 79, any frequency modulation imparted on the input signal can be determined by comparing the output of the filter of the PLL to a predetermined relationship to input frequency. This comparison may be made manually by a user, or may be made by a processing system of the test device, wherein a resulting value indicative of measured frequency may be provided to the user in step 75.

It should be understood that while embodiments of the present invention are described generally as being implemented into a portable, hand-held device, systems according to embodiments of the present invention may be implemented into the phased array itself. Further, in addition to testing phase and frequency modulation of the array, it follows that systems and methods according to embodiments of the present invention can be used to perform array alignments, including an entire array, or any elemental paths of the array.

The embodiments are provided by way of example only, and other embodiments for implementing the methods described herein may be contemplated by one of skill in the pertinent art without departing from the intended scope of this disclosure. For example, the method has been explained by way of example, to include memory containing data, which may include instructions, the instructions when executed by a processor, cause the steps of a method for performing the signal demodulation and comparisons to pre-established system responses. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

The invention claimed is:

1. A device for performing nearfield testing of a phased array system comprising:
   an input interface configured to receive a modulated output signal of the phased array;
   a phase-locked loop circuit responsive to the received modulated output signal, the phase-locked loop circuit comprising:
   a phase detector;
   a filtering element;
   a variable frequency oscillator, and
   a feedback loop, and
   a processor configured to:
   compare an output of at least one of the phase detector and the filtering element with a predetermined phase detector response and an input frequency response of the phase-locked loop, respectively, and
   based on the comparison, output at least one of a value indicative of an imparted phase shift and an imparted frequency modulation by the system.

2. The device of claim 1, wherein the phase detector is responsive to the received output signal of the phased array, and to the output of the variable frequency oscillator via the feedback loop.

3. The device of claim 1, further comprising a data storage device, wherein at least one of the predetermined phase detector response and the input frequency response of the phase-locked loop is stored on the data storage device and accessible by the processor.

4. The device of claim 1, wherein the phase detector response represents the relationship between the output of the phase detector and the phase of the input signal to the phase detector, and the input frequency response of the phase-locked loop represents the relationship between the output of the filtering element and the frequency of the input signal to the phase detector.

5. The device of claim 2, wherein the filtering element comprises a narrowband filter, and the device is configured to output a value indicative of the output of the phase detector.

6. The device of claim 2, wherein the filtering element comprises a wideband filter, and the device is configured to output a value indicative of the output of the wideband filter.

7. The device of claim 2, wherein the filtering element comprises a switchable loop filter having a wideband filter and a narrowband filter.

8. The device of claim 7, further comprising a user interface, the interface responsive to an input for selectively controlling the switchable loop filter.

9. The device of claim 8, wherein the device is configured to output a value indicative of the output of the phase detector when the narrowband filter is selected, and the device is configured to output a value indicative of the output of the filtering element when the wideband filter is selected.

10. The device of claim 1, wherein the input interface includes an antenna for receiving the modulated output signal of the phased array.

11. The device of claim 1, further comprising a display for outputting at least one of the value indicative of the output of the phase detector and the value indicative of the output of the filtering element to a user.

12. A method of testing a phased array RADAR system comprising:
receiving a modulated output signal from the system;
demodulating the received signal through a phase-locked loop, the phase-locked loop comprising a phase detector, a filter and a variable frequency oscillator, wherein the output of the variable frequency oscillator is provided in a feedback loop to an input of the phase detector; and
comparing the output of the phase detector to a predetermined phase detector response for determining the imparted phase shift on the output signal of the system.

13. The method of claim 12, further comprising the step of comparing the output of the filter to a predetermined frequency response of the phase-locked loop to estimate the frequency modulation imparted on the output signal of the system.

14. The method of claim 12, wherein the filter comprises a switchable loop filter having a narrowband and a wideband filter.

15. The method of claim 14, wherein the step of demodulating the received signal comprises the step of selecting the narrowband filter to receive the output of the phase detector.

16. The method of claim 14, wherein the step of demodulating the received signal further comprises the step of selecting the wideband filter to receive the output of the phase detector.

* * * * *